Jan. 7, 1969   L. A. DEIMEN   3,419,953
METHOD OF TREATING AND CONNECTING TUBE FITTINGS
Filed Jan. 6, 1966

INVENTOR
LAWRENCE A. DEIMEN
BY *Jerry K. Harness*
his ATTORNEY

United States Patent Office 3,419,953
Patented Jan. 7, 1969

3,419,953
METHOD OF TREATING AND CONNECTING
TUBE FITTINGS
Lawrence A. Deimen, Ann Arbor, Mich., assignor to
Aeroquip Corporation, Jackson, Mich.
Filed Jan. 6, 1966, Ser. No. 519,071
U.S. Cl. 29—474.5     3 Claims
Int. Cl. B23k 35/12

ABSTRACT OF THE DISCLOSURE

The invention relates to the method of treating and thereafter brazing together light weight tubing components which are usable primarily in aerospace systems. The treatment includes peening with clean glass beads to provide a clean matte surface thereby insuring a clean, strong, reliable brazed connection.

---

Figure 1:
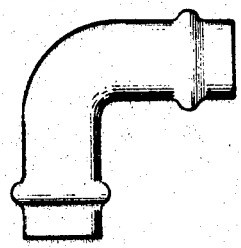

The invention pertains to conduit fittings and particularly pertains to fittings wherein the conduits and fittings of the system are interconnected by brazing. In particular, the invention pertains to a fitting which may be brazed to conduits in an interatmosphere or fluxless environment wherein an unusually high quality connection between the fitting and conduit is obtained.

In the aircraft and spacecraft arts and in other applications wherein a high degree of reliability of fluid conduit systems is required, brazing techniques are often employed to interconnect the fittings of the system to the conduits. Brazing produces high resistance to vibration, in that a high strength interconnection between the conduit and fitting is provided. Additionally, fittings and conduits which are brazed together have a minimum envelope size with respect to other fittings, such as those employing threaded interconnections, may be installed close to walls, bulkheads and the like, have high efficiency flow characteristics, and the space saving and weight saving advantages of brazed fitting and conduit systems makes their use in aircraft most desirable. In such applications it is desirable that the brazing operation be fluxless and is usually performed in a nonoxidizing atmosphere.

In order to insure a high quality brazed connection between the fitting and conduit, flow of the brazing material in the capillary gap between the conduit and fitting must be uniform, complete and free of voids. One of the major problems which arise in brazed conduit systems occurs because of uneven brazing material flow due to oxides or other corrosion or foreign matter existing on the surfaces of the fitting or conduit in the region bonded by the brazing material.

It is a basic object of the invention to provide a method for preparing a metallic conduit fitting which is to be brazed to a conduit whereby optimum brazing characteristics are produced.

It is another object of the invention to provide a method for preparing a metallic conduit fitting wherein optimum brazing characteristics are assured over a long period of time and wherein such brazing characteristics are not materially impaired by storage of the fitting after treatment, thus providing long "shelf-life" characteristics.

A further object of the invention is to provide a method for preparing a metallic conduit fitting and joint for optimum brazing characteristics and storage life wherein the method may be practiced with known tools and equipment.

Another object of the invention is to provide a method for preparing a metallic conduit fitting for optimum brazing and storage life wherein the fitting employs a preformed ring of brazing material disposed adjacent the fitting surface at which brazing is to occur. The ring of brazing material is also treated in the practice of the invention to insure that the brazing material also maintains effective brazing characteristics over storage periods.

In the practice of the invention optimum brazing characteristics over long periods of time are obtained by compressing the surfaces to be brazed at contiguous small areas whereby the surface grains of the material of the fitting, conduit, and brazing ring are stressed by compression and, therefore, have a much greater resistance to oxidation than before being compressed. Preferably, such compression is produced at the surfaces to be brazed by peening the surfaces with glass beads of a diameter approximately .003 inch. Such a peening action causes a matte finish to occur at the surfaces to be brazed, and it has been found that this matte finish, in conjunction with the compression of the fitting and conduit surfaces provides a uniform and consistent flow of the brazing material, when melted, which is free of voids and produces a high degree of reliability of interconnection between the fitting and conduit.

Figure 2:
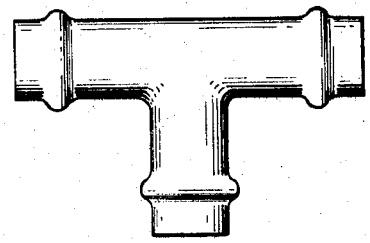
Figure 3:
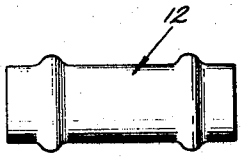
Figure 4:
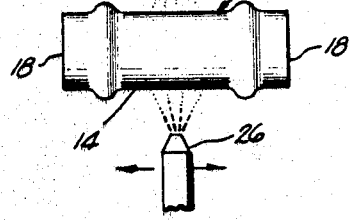
Figure 6:
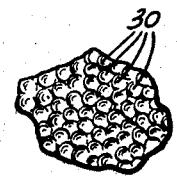
Figure 7:
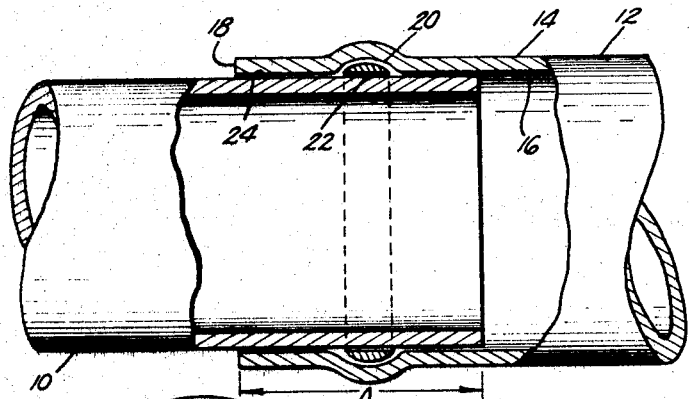
Figure 5:
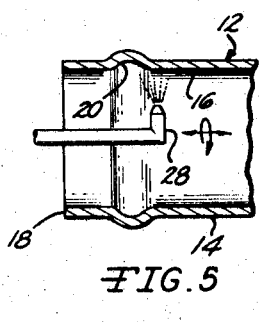
Figure 8:
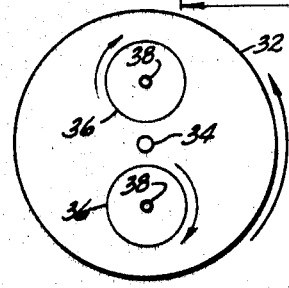

The above objects of the invention will be apparent from the following description and accompanying drawings wherein:

FIGS. 1 through 3 are elevational views of elbow, T and union conduit fittings, respectively, in accord with the invention, FIG. 4 is an elevational, schematic view of the exterior treatment of a union fitting in accord with the invention, FIG. 5 is an elevational, sectional view of an interior treatment of a union fitting in accord with the invention, FIG. 6 is an enlarged, detail, elevational view of the matte finish produced by the peening operation on the surfaces to be brazed, FIG. 7 is an elevational, sectional view of the assembled relationship between the end of a fitting and a conduit prior to the brazing ring being melted and the brazing operation occurring, and FIG. 8 is a schematic view of a tumbling apparatus which may be used to prepare the surfaces of fittings in accord with the invention.

The types of fittings with which the method of the invention may be practiced are varied. FIG. 1 illustrates an elbow fitting. FIG. 2 illustrates a T fitting, and FIG. 3 shows a union fitting. As the practice of the method of the invention is most likely to be economically practical in those fluid systems wherein a high degree of reliability of interconnection between the conduit and fitting is required, the fittings, and usually the conduits, will be formed of a high quality metal such as stainless steel. In one commercial application of the invention, the fittings are formed of 304L stainless steel. However, it will be appreciated that the inventive concept of the invention can be utilized with any metallic fitting subject to oxidation and surface working by peening. While stainless steel alloys are not as likely to oxidize to the extent as many other metals, oxidation does occur in stainless steel and such oxidation adversely affects the efficiency and character of a brazed joint between stainless steel fittings and conduits.

In the fittings of the invention, a conduit 10, FIG. 7, is adapted to be inserted into the bore or inner surface of a fitting 12. Each fitting, regardless of type, will include an outer surface 14 and an inner cylindrical surface 16 adjacent the fitting end 18. Preferably, the fittings are provided with an annular deformation extending radially outward whereby an annular recess 20 is defined for receiving an annular ring 22 of brazing material. The ring 22 is radially severed at one location whereby it may be radially contracted for being inserted into the recess 20. Upon the end portion 24 of the conduit 10 being inserted into a fitting bore inner surface 16, as shown in FIG. 7, the portion of the fitting receiving the conduit end portion 24 is subjected to heating means, such as a high frequency induction heater, to produce a temperature within the fitting, brazing ring and conduit end portion sufficient to melt the brazing material and cause the brazing material to flow within the annular capillary gap defined by the fitting inner surface 16 and the outer diameter of the conduit end portion 24. The brazing operation is preferably of the interatmosphere or fluxless type wherein an inert or nonoxidizing gas is used to surround the fitting and conduit during brazing. This type of brazing operation provides an unusually "clean" connection, as is most important in aircraft and spacecraft applications. The brazing material will flow in both axial directions with respect to the recess 20 and to produce the desired degree of reliability of interconnection, substantially all of the axially aligned fitting inner surface 16 and conduit end portion 24 should form the brazed connection. This axial length is represented at A, as shown in FIG. 7. To insure that the fitting and conduit surfaces lying within the axial area A are engaged and wholly united by the brazing material, the conduit end portion 24 is inserted into the fitting inner surface 16 to a depth that is related to the amount of brazing material and the radial dimension of the capillary gap existing between the fitting inner surface and the conduit end portion. In one commercial embodiment of the invention the radial capillary gap between the fitting inner surface 16 and the conduit end portion outer diameter is no greater than .006 inch.

In the practice of the method of the invention, optimum brazing characteristics and storage or shelf life of the components to be brazed are provided by treating the surface of the fitting, brazing ring and, preferably, the conduit end portion. Such treatment of the surfaces of these components comprises working and compressing the surfaces by peening to stress the surfaces and compress the grain of the surface material. Such working of the surfaces to place them under compression causes the surfaces to oxidize much slower than surfaces which are not compressed or similarly treated. As the presence of oxidation on fitting and conduit surfaces is a primary cause for defective brazing connections, the minimizing of the oxidation of the fitting, brazing ring, and conduit significantly improves the brazing characteristics and produces reliable uniformity between a plurality of brazed connections. Additionally, the matte finish resulting from the surface treatment appears to be most conducive in promoting flow of the brazing material, and the peening operation to compress the surface material appears to activate the metal surfaces by removing all the oxides, minute voids, and surface contamination which might otherwise retard flow of the brazing alloy.

In the practice of the method of the invention, the fittings may be treated as follows: Prior to the surface compression treatment, the fittings should be cleaned, if necessary, to insure that the inner and outer surfaces are free of grease and oil, or other foreign matter. After a preliminary cleaning, the outer and inner surfaces 14 and 16 of the fitting 12 are compressed by a peening operation wherein a stream of chemically and metallurgically clean glass beads approximately .003 inch in diameter and water are forced by air pressure into engagement with the fitting surfaces. Normally, an air pressure within the range of 15 to 40 p.s.i. is employed to eject the beads and water from nozzles 26 which are positioned approximately eight inches from the fitting during peening of the outer surface 14. When peening the fitting inner surface 16 of the fitting, as shown in FIG. 5, a nozzle 28 is placed within the fitting bore. The nozzles 26 and 28 are moved back and forth with respect to the fitting, or the fitting is moved relative to the nozzles, and either the nozzles or fitting are rotated to form a matte surface over the entire outer and inner surfaces 14 and 16 of the fitting 12. An enlarged view of the matte surface formed is shown in FIG. 6 wherein the surface will consist of a plurality of small indentations or recesses 30 which are contiguous and overlapping caused by the glass beads. Peening without water may also be employed.

The impact of the glass beads on the fitting surfaces producing the indentations 30 compresses the grains of the fitting material forming the surfaces 14 and 16 and substantially increases the resistance of the treated surfaces to oxidation. Simultaneously, the glass beads will clean the fitting surfaces, remove tool marks, and provide the fitting surfaces with a uniform appearance which aids in the observation of defects such as cracks or the like.

After the peening operation by the glass beads, the fitting may be cleaned by cold and hot rinsings in water, thoroughly dried, and the fittings would then be inspected to insure that one hundred percent of the inner and outer surfaces 14 and 16 and end 18 of the fitting are covered with the matte surface.

It is desirable to again impel the wet glass beads against the inner surface 16 of the fitting in the axial portion A to insure that this very important surface of the fitting is fully compressed and covered with the matte surface, as it is in this area that the brazing connection occurs. This second working of the inner surface of the fitting in the brazing region will insure that no minute voids due to oxidation occur in the inner surface, and it will be appreciated that it is most important that the treatment of the fitting be properly accomplished in the brazing region. The fittings are again cleaned after this operation and inspected.

As the material of the brazing ring 22, itself, is subject to oxidation, it is also desirable to work the exposed surfaces of the ring 22 by the glass bead peening operation to compress the surfaces of the brazing ring material and form the matte surface thereon by compression of the grain structure. Thus, oxidation of the brazing material is also retarded. After the brazing ring 22 has been treated in accord with the method of the invention and a clean uniform matte surface is formed thereon, the brazing ring will be cleaned and inserted into the recesses 20 of the fitting. It will be appreciated that the elbow and union fittings require two brazing rings, while the T fitting of FIG. 2 requires three brazing rings.

After the brazing ring 22 has been inserted into the treated and cleaned fitting, the fitting is preferably placed in an airtight container, such as a sealed plastic bag, to minimize exposure of the fitting to an oxidizing atmosphere.

The conduits which are received within the conduit fittings vary considerably in length and such conduits are often cut to the desired length at the location of installation of the conduit system. However, with the shorter "nipples" and conduits of standard length which often form a large part of a brazed conduit system, and in conduit systems which are preassembled, the end portions 24 of the conduits are also, preferably, treated on the outer surface in accordance with the practice of the method of the invention. In the treatment of an end portion 24 of the conduit 10, the conduit end portion is preliminarily cleaned as to be free of grease or foreign matter and then subjected to a peening operation of wet glass beads being forced against the end portion 24 under air pressure, as in the treatment of the fittings. The conduit end portion should be so treated throughout an axial length slightly greater than the axial length of the conduit end portion received within the fitting inner surface 16. Normally, only the outer surface of the conduit end portion need be treated. However, the entire conduit OD and ID must be clean. After the peening treatment the conduit end portion is cleaned and dried. The end portions of conduits treated in accord with the invention will, therefore, resist oxidation and optimum brazing characteristics are provided in those instances wherein the fittings, brazing rings, and conduit end portions are all treated by the glass beads to form compressed matte surfaces on all of the surfaces to be brazed.

While the above treatment of the fitting, brazing ring, and conduit end portions with the glass beads is a form of "shot" peening, it is possible to use other manufacturing techniques to compress the surface grains of the fitting, ring or conduit end portions in a similar manner to form the matte finish and compress the metal grains in the desired manner to resist oxidation and provide superior brazing flow and adhesion characteristics. One manner of treatment of the conduit fittings to produce a similar surface treatment is schematically shown in FIG. 8, wherein an outer tumbling barrel is represented at 32 adapted to rotate about an axis 34. Within the rotatable tumbling barrel 32 a pair of diametrically opposed smaller tumbling barrels 36 are mounted. The barrels 36 are mounted for independent rotation about their associated axes 38. Within the inner tumbling barrels 36 wet glass beads of the type described above are placed along with fittings, brazing rings or conduits to be treated. Additionally, steel pins in the form of needle bearings having a length one-quarter to one-half inch and approximately one-sixteenth inch in diameter are placed within the mass of glass beads and fittings. The outer barrel 32 is then rapidly rotated in the direction indicated by the associated arrow and the inner barrels 36 are rotated in the direction indicated by their associated arrows. Such compound orbital rotation produces very high centrifugal forces on the fittings, glass beads and steel pins within the barrels 36 which press the beads against the surfaces of the fittings and work the surfaces to perform the desired matte finish which compresses the surfaces at a plurality of contiguous areas as shown in FIG. 6. The steel pins are particularly advantageous in preventing "caking" of the glass beads. An advantage of performing the basic concept of the invention in accord with the apparatus of FIG. 8 lies in the fact that a plurality of fittings may be simultaneously treated. However, it may be necessary to separately perform the operation shown in FIG. 5 if the tumbling treatment does not sufficiently compress the inner surfaces 16 of the fittings in the area A at which the brazing occurs.

By treating the fittings of a brazed conduit system in accord with the practice of the invention, the fittings may be stored for long periods of time without the fittings becoming unduly oxidized as to adversely affect the brazing characteristics. Thus, the practice of the invention substantially extends the storage or shelf life of this type of fitting wherein the reliability of the brazing connection is of utmost importance. The matte finish formed on the fittings is of an attractive appearance providing a uniform surface free of tool marks and the like. Additionally, the surface working of the fittings in the area A at which the brazing occurs appears to promote the flow of the brazing material for reasons which are not completely understood except that it is known that the elimination of voids due to oxidation and the elimination of foreign matter, dirt and the like which is removed during the treatment by peening, aids in promoting superior brazing characteristics. It is believed that the working of the inner surface 16 of the fitting and the conduit end portion 24 by the glass beads activates the grains of the fitting and conduit surfaces for promoting flow of the brazing alloy.

It is appreciated that various modifications to the practice of the invention may be apparent to those skilled in the art. For instance, other treatment processes than those disclosed for working the surfaces of the fitting, braze ring, and conduit may occur to those skilled in the art without departing from the spirit and scope of the invention, and it is intended that the invention be defined only by the following claims.

I claim:
1. The method of preparing for and making a joint between a metallic conduit fitting having an inner cylindrical surface adapted to receive the cylindrical end of a metallic conduit, the fitting having a ring of brazing material located therein adjacent said inner surface, and a metallic conduit having a cylindrical end, comprising the steps of:
   (a) compressing by peening the inner surface of the fitting at a plurality of small contiguous areas to compress the outer layers of the grain of the material of said surface forming a matte finish upon and cleaning said surface,
   (b) compressing by peening that portion of the surface of the conduit cylindrical end which is to be received within the fitting inner surface and brazed thereto at a plurality of small contiguous areas to compress the outer layers of the grain of the conduit end material forming a matte finish on and cleaning the conduit end,
   (c) inserting the conduit end into the fitting inner surface whereby the ring of brazing material circumscribes the conduit end, and
   (d) heating the fitting, conduit end and brazing ring to a brazing temperature to melt the ring and braze the conduit end of the fitting inner surface at the location of the matte finishes thereof.

2. The method of preparing for and making a joint as in claim 1 wherein:
   (a) the compression of said fitting inner surface and conduit end is formed by peening with chemically and metallurgically clean glass beads.

3. The method of preparing for and making a joint as in claim 1 wherein:
   (a) said fitting and conduit end are placed within a nonoxidizing atmosphere during the heating thereof to a brazing temperature.

References Cited

UNITED STATES PATENTS

| 1,326,912 | 1/1920 | Cary | 219—83 |
| 2,053,808 | 9/1936 | Young | 29—475 |
| 2,249,723 | 7/1941 | Orr | 29 |
| 2,640,002 | 5/1953 | Clayton | 29 |
| 2,763,058 | 9/1956 | McCullough | 29—488 |
| 2,812,419 | 11/1957 | Chyle | 219—118 |
| 2,937,438 | 5/1960 | Lemon | 29—504 X |
| 3,007,285 | 11/1961 | Bigelow | 29—90.8 X |
| 3,107,421 | 10/1963 | Turnbull | 29—474.4 X |
| 3,205,573 | 9/1965 | Seal | 29—488 X |
| 3,321,828 | 5/1967 | Miller | 29—488 |

OTHER REFERENCES

"Uses of Shot Peening Other Than for Fatigue Durability," by L. J. Wieschhaus, Product Engineering, August 1947, pp. 122–126.

"How Surface Peening Improves Metal Parts," by Rick Mansell, Steel Processing, October 1948, pp. 549–551 and 556.

JOHN F. CAMPBELL, *Primary Examiner.*

R. F. DROPKIN, *Assistant Examiner.*

U.S. Cl. X.R.

29—488, 494, 501; 219—85, 117